US008694012B2

(12) United States Patent
Mueck

(10) Patent No.: US 8,694,012 B2
(45) Date of Patent: Apr. 8, 2014

(54) METHOD AND APPARATUSES FOR TWO OR MORE NEIGHBORING WIRELESS NETWORK DEVICES ACCESSING A PLURALITY OF RADIO RESOURCES

(75) Inventor: Markus Mueck, Unterhaching (DE)

(73) Assignee: Intel Mobile Communications GmbH, Neubiberg (DE)

( * ) Notice: Subject to any disclaimer, the term of this patent is extended or adjusted under 35 U.S.C. 154(b) by 366 days.

(21) Appl. No.: 12/697,362

(22) Filed: Feb. 1, 2010

(65) Prior Publication Data
US 2011/0189999 A1 Aug. 4, 2011

(51) Int. Cl.
H04W 72/00 (2009.01)

(52) U.S. Cl.
USPC .............. 455/450; 455/452.1; 455/452.2; 455/453; 455/509; 370/329; 370/330; 370/431; 370/328

(58) Field of Classification Search
USPC .............. 455/450, 452.1, 452.2, 453, 509; 370/329, 330, 431, 328
See application file for complete search history.

(56) References Cited

U.S. PATENT DOCUMENTS

| 2009/0186609 | A1 | 7/2009 | Wu et al. | |
| 2009/0264123 | A1* | 10/2009 | Agashe et al. | 455/434 |
| 2009/0274086 | A1* | 11/2009 | Petrovic et al. | 370/312 |
| 2009/0296635 | A1* | 12/2009 | Hui et al. | 370/328 |
| 2009/0296641 | A1* | 12/2009 | Bienas et al. | 370/329 |
| 2009/0296663 | A1* | 12/2009 | Wild | 370/335 |
| 2010/0173667 | A1* | 7/2010 | Hui et al. | 455/552.1 |
| 2012/0064897 | A1* | 3/2012 | Amirijoo et al. | 455/436 |
| 2012/0108287 | A1* | 5/2012 | Hamel et al. | 455/525 |

FOREIGN PATENT DOCUMENTS

| CN | 101472317 A | 7/2009 |
| EP | 2104385 A1 | 9/2009 |
| WO | 2009065075 A1 | 5/2009 |
| WO | 2009082967 A1 | 7/2009 |
| WO | 2009120689 A2 | 10/2009 |
| WO | 2009120934 A1 | 10/2009 |
| WO | 2009129261 A1 | 10/2009 |
| WO | 2009131898 A1 | 10/2009 |

OTHER PUBLICATIONS

Yavuz et al., Interference management and performance analysis of UMTS/HSPA+ Femtocells—[Femtocell Wireless Communications], IEEE Communications Magazine, vol. 47, Issue 9, Sep. 2009, pp. 102-109.

Garcia et al., Autonomous component carrier selection: interference management in local area environments for LTE-advanced—[Femtocell Wireless Communications], IEEE Communications Magazine, vol. 47, Issue 9, Sep. 2009, pp. 110-116.

(Continued)

Primary Examiner — Khai M Nguyen

(57) ABSTRACT

Methods and apparatuses for two or more neighboring base stations to access a plurality of radio resources are described. The method includes defining a channel quality requirement by one or more access conditions and assigning the plurality of radio resources to the channel quality requirement, wherein a neighboring base station has access to the plurality of radio resources and the neighboring base station neighbors a target base station. The method also includes allowing the target base station access to the plurality of radio resources if the target base station satisfies the channel quality requirement.

18 Claims, 8 Drawing Sheets

(56) References Cited

OTHER PUBLICATIONS

Knisely et al., Standardization of femtocells in 3GPP—[Femtocell Wireless Communications], IEEE Communications Magazine, vol. 47, Issue 9, Sep. 2009, pp. 68-75.

Knisely et al., Standardization of femtocells in 3GPP2—[Femtocell Wireless Communications], IEEE Communications Magazine, vol. 47, Issue 9, Sep. 2009, pp. 76-82.

Lin et al., Dynamic Resource Transaction in Self-Organizing Femtocell Network (SON), Contribution to IEEE 802.16m Standardization, Contribution No. IEEE C802.16m-Sep. 2002, http://ieee802.org/16, Aug. 29, 2009, pp. 1-12.

3GPP TS 36.211, V9.0.0, 3rd Generation Partnership Project, Technical Specification Group, Radio Access Network, Evolved Universal Terrestrial Radio Access (E-UTRA), Physical Channels and Modulation, Release 9, Dec. 2009, pp. 1-85.

* cited by examiner

METHOD AND APPARATUSES FOR TWO OR MORE NEIGHBORING WIRELESS NETWORK DEVICES ACCESSING A PLURALITY OF RADIO RESOURCES

BACKGROUND

Various embodiments relate generally to the efficient, simultaneous use of radio resources among neighboring wireless network devices such as base stations and/or mobile communication devices.

One wireless network device is a base transceiver station (also referred to as base station or NodeB or eNodeB). A base transceiver station typically contains radio frequency transmitters and receivers used to communicate directly with mobile radio communication terminal devices, such as mobile telephones, that move freely within a communication range of one or more such base stations. A type of base station, known as a femto base station may soon be added to many mobile radio communication networks.

A femto base station may be understood to be a modified base station for use in buildings or home environments in order to increase or improve the in-building coverage of the mobile radio communication network. A typical use for such a femto base station may be, for example, in the home or apartment of a mobile radio communication terminal device user. The user would use a broadband (possibly wired) network connection, such as a conventional digital subscriber line (DSL) connection, to connect a femto base station to the user's mobile radio operator's core network. This usage may be beneficial for both the user and the mobile radio communication network operator, since the user may save money and battery power on his mobile radio communication terminal device due to improved coverage within his home or building, and the operator may receive additional network coverage and save on energy costs.

Mobile radio communication networks may also be expanding public and private near-field communications among mobile communication devices through peer-to-peer communication technologies such as Bluetooth and Wi-Fi Direct.

For example, mobile communication devices (MCD) may operate as a central hub, allowing other MCD to communicate among each other and thus bypassing a conventional access point such as a base station.

Providing mechanisms and techniques to control and adjust a communication channel quality among base stations, femto base stations, and MCDs may be desirable, especially because base stations, femto base stations, and MCDs may want to utilize the same radio resources at the same time in an overlapping coverage area and/or channel quality may change with additional or less base stations, femto base stations, and MCDs operating in a given area.

SUMMARY

Embodiments provide a method and apparatus for two or more neighboring base stations to access a plurality of radio resources. The method may include defining a channel quality requirement by one or more access conditions and assigning the plurality of radio resources to the channel quality requirement, wherein a neighboring base station has access to the plurality of radio resources and the neighboring base station neighbors a target base station. The method may further include allowing the target base station access to the plurality of radio resources if the target base station satisfies the channel quality requirement.

Embodiments further provide a method for two or more neighboring base stations to access a plurality of radio resources. The method may include defining a channel quality requirement by one or more access conditions, allowing the target base station access to the plurality of radio resources if the target base station satisfies the channel quality requirement, and selecting a preferred base station. The preferred base station may perform assigning the plurality of radio resources to the channel quality requirement, wherein the preferred base station has access to the plurality of radio resources, and the preferred base station neighbors a target base station. The preferred base station may also perform transmitting the channel quality requirement to the target base station.

Embodiments further provide a base station comprising a processor, a radio module, and a memory. The memory may include a set of instructions that when executed by the processor causes the base station to select a second base station as a preferred base station, the preferred base station having access to a plurality of radio resources and neighboring a target base station.

Embodiments further provide a base station comprising a processor, a radio module, and a memory. The memory may include a set of instructions that when executed by the processor causes the base station to have access to a plurality of radio resources assigned to a channel quality requirement if the base station satisfies the channel quality requirement, the channel quality requirement being defined by one or more access conditions.

Embodiments further provide a wireless network device comprising a processor, a radio module, and a memory. The memory may include a set of instructions that when executed by the processor causes the wireless network device to assign a plurality of radio resources to a channel quality requirement, wherein the wireless network device has access to the plurality of radio resources, the wireless network device neighboring a target wireless network device, and transmit the channel quality requirement to the target wireless network device, wherein the target wireless network device is allowed access to the plurality of radio resources if the target wireless network device satisfies the channel quality requirement, the channel quality requirement defined by one or more access conditions.

Embodiments further provide a wireless network device comprising a processor, a radio module, and a memory. The memory may include a set of instructions that when executed by the processor causes the wireless network device to have access to a plurality of radio resources assigned to a channel quality requirement if the wireless network device satisfies the channel quality requirement, the channel quality requirement being defined by one or more access conditions.

BRIEF DESCRIPTION OF THE DRAWINGS

In the drawings, like reference characters generally refer to the same parts throughout the different views. The drawings are not necessarily to scale, emphasis instead generally being placed upon illustrating the principles of embodiments. In the following description, various embodiments are described with reference to the following drawings, in which.

DESCRIPTION

Figure 1A:
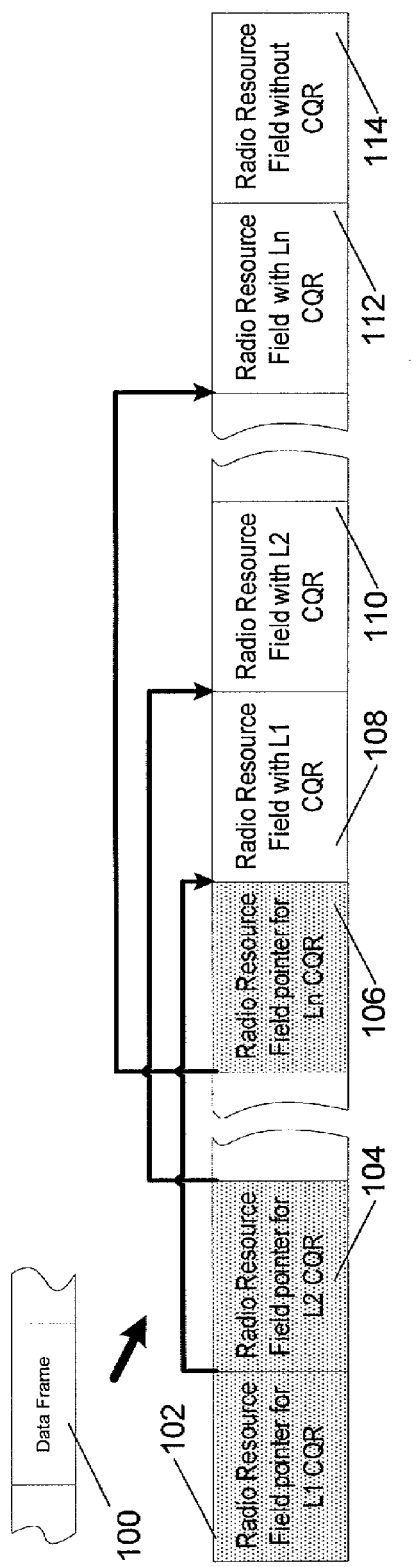
FIG. 1A shows a data frame containing channel quality requirements according to an embodiment.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Although specific embodiments may include macro base stations and/or femto base stations, embodiments are equally applicable to base stations of any type. Thus, unless specifically noted to the contrary, the terms base station, femto base station, femto advanced base station (Femto ABS as defined by the IEEE 802.16m specification), access point base station, macro base station, advanced macro base station, Home Node B (HNB), or Home eNode B (HeNB) are interchangeable when describing novel features and/or functionalities. That is, the novel features and/or functionalities may be implemented on a wide range of base stations types and are not limited to the base station types described in the embodiments below.

In any case, the term "base station" includes at least the above base station types and similar devices.

A femto base station may be a base station with low transmission power, typically installed by a subscriber in the home or small office home office (SOHO) to provide the access to closed or open group of users as configured by the subscriber and/or the access provider.

A femto base station may include a base station connected to a service provider's network via one or multiple wired and/or wireless broadband connections (e.g., Cable, DSL, GSM systems, 3GPP systems, E-UTRA systems, UTRA systems, WiFi systems, Wireless-OFDMA reference systems, Advanced WirelessMAN-OFDMA systems, or any other type of suitable wireless or wired system).

Femto base stations may operate in a licensed spectrum and may use the same or different frequency as macro (A)BSs. A femto base station's coverage may overlap with a macro (A)BS.

A femto base station may serve public users like an Open Subscriber Group (OSG), or to serve a Closed Subscriber Group (CSG), that is a set of subscribers authorized by the owner of the femto base station or the network service provider. CSG may be modified by the service level agreement between the subscriber and the network service provider. Alternatively, a selected femto base station may operate in unlicensed spectrum or in the so-called White Spaces.

In various embodiments, a 'Home NodeB' may be understood as a trimmed-down version of a cellular mobile radio base station optimized for use in residential or corporate environments (e.g., private homes, public restaurants or small office areas) that operates in accordance with 3GPP.

The so-called 'Home Base Station' concept shall support receiving and initiating cellular calls at home, and uses a broadband connection (typically DSL, cable modem or fiber optics) to carry traffic to the operator's core network bypassing the macro network architecture (including legacy NodeBs or E-NodeBs, respectively), i.e. the legacy UTRAN or E-UTRAN, respectively. Femto BSs such as a Home NodeB may operate with all existing and future handsets rather than requiring customers to upgrade to expensive dual-mode handsets or UMA devices.

From the customer's perspective, 'Home NodeBs' offer the user a single mobile handset with a built-in personal phonebook for all calls, whether at home or elsewhere. Furthermore, for the user, there is only one contract and one bill. Yet another effect of providing 'Home NodeBs' may be seen in the improved indoor network coverage as well as in the increased traffic throughput. Moreover, power consumption may be reduced as the radio link quality between a handset and a 'Home Base Station' may be expected to be much better than the link between a handset and legacy 'NodeB'.

In an embodiment, access to a 'Home NodeB' may be allowed for a closed user group only, i.e. the communication service offering may be restricted to employees of a particular company or family members, in general, to the members of the closed user group. This kind of 'Home Base Stations' may be referred to as 'Closed Subscriber Group Cells' (CSG Cells) in 3GPP.

A mobile radio cell which indicates being a CSG Cell may need to provide its CSG Identity to the mobile radio communication terminal devices (e.g. the UEs). Such a mobile radio cell may only be suitable for a mobile radio communication terminal device if its CSG Identity is e.g. listed in the mobile radio communication terminal device's CSG white list (a list of CSG Identities maintained in the mobile radio communication terminal device or in an associated smart card indicating the mobile radio cells which a particular mobile radio communication terminal device is allowed to use for communication). In various embodiments, a home base station may be a consumer device that is connected to the mobile radio core network via fixed line (e.g. DSL) or wireless to a mobile radio macro cell. It may provide access to legacy mobile devices and increase the coverage in buildings and the bandwidth per user. In various embodiments, a home base station may be run in open or closed mode. In closed mode the home base station may provide access to a so-called closed subscriber group (CSG) only. Examples for such closed subscriber groups are families or some or all employees of a company, for example.

As a 'Femto Cell' entity or 'Home Base Station' entity will usually be a box of small size and physically under control of the user, in other words, out of the MNO's domain, it could be used nomadically, i.e. the user may decide to operate it in his apartment, but also in a hotel when he is away from home, e.g. as a business traveler. Additionally a 'Home NodeB' may be operated only temporarily, i.e. it can be switched on and off from time to time, e.g. because the user does not want to operate it over night or when he leaves his apartment.

The term MCD may be replaced with user equipment (UE), mobile phone, Mobile Internet Device (MID), or terminal device and are interchangeable when describing novel features and/or functionalities. That is, the novel features and/or functionalities may be implemented on a wide range of MCD types and are not limited to the base station types described in the embodiments below.

The term "legacy MCD" includes UEs that are able to operate as specified for Release 7 of UMTS.

The term "neighboring base station" and similar terms are to be understood to include those base stations that are located within a radio coverage area of another base station and/or can interfere with a radio coverage area of another base station.

With respect to MCDs, "neighboring base station" may include base stations that are located within a radio coverage area of an MCD and/or can interfere with a radio coverage area of MCD. In some embodiments, "neighboring base station" may be a base station in radio communication contact with an MCD.

The term "wireless network device" encompasses at least macro base stations, femto base stations (and similar devices), and MCDs (and similar devices).

The following embodiments may be implemented by hardware, firmware, software, or a combination of them. In the case of a hardware implementation, embodiments may be implemented with ASICs (application specific integrated circuits), DSPs (Digital signal processors), DSPDs (digital signal processing devices), PLDs (programmable logic devices), FPGAs (field programmable gate arrays), a processor, a controller, a microcontroller, or a microprocessor, or similar devices.

In the case of a software implementation, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Embodiments include a wireless network device configured to distribute and/or comply with condition tables. In some embodiments, condition tables can be pre-programmed into a wireless network device or distributed by a network operator or wireless network device via wired or wireless communication mediums.

These condition tables contain access conditions to be met by other neighboring base stations ("target base stations") if they wish to also access the same radio resources in the uplink or downlink direction as another neighboring base station. In some embodiments, the condition tables may be organized within a frame. Thus data frames may contain a header indicating which part or parts of the frame require(s) a particular condition. In some embodiments, the conditions may be organized into channel quality levels. For each channel quality requirement (CQR), a corresponding access condition is defined in the condition tables.

For example, neighboring Femto or other types abase stations such as a mobile base station may be part of a dense, mass deployment of base stations that results in few available radio resources. Thus, accepting a level of interference may be a reasonable tradeoff in allowing neighboring base stations (Femto, Macro, or other types) access to the same radio resources in frequency, time, or both so that neighboring base stations may utilize the same radio resources.

Being allowed access to radio resources may include the ability to utilize radio resources if needed or desired. Utilizing radio resources may include transmitting or receiving data over radio resources or assigning radio resources to another wireless network device to transmit or receive data over radio resources.

To allow other wireless network devices to utilize radio resources, a macro base station and/or designated "preferred" base station may impose various levels of channel quality requirements onto a plurality of radio resources that the macro and/or preferred base station have access to. The plurality of radio resources may be accessible to a macro base station and/or preferred base station without having to satisfy a channel quality requirement, i.e., a plurality of radio resources that a macro base station and/or preferred base station may utilize in communicating with another network entity such as an MCD.

In some embodiments the plurality of radio resources may be organized in frames, and thus, in some embodiments, channel quality requirements may be assigned on a frame-by-frame basis.

In some embodiments, the channel quality requirements are defined in condition tables. The condition table may define various levels of channel quality requirements (CQR). The level of channel quality may be indicated by "L1", "L2", etc. . . . "L1" is the highest level of CQR, "L2" is the second highest, etc. . . . In one embodiment, the condition table is structured as the following:

| Channel Quality level | Access Condition for base station |
|---|---|
| L1 | Description of access condition |
| L2 | Description of access condition |
| L3 | Description of access condition |

However, in some embodiments, CQRs may include one or more access conditions without a CQR level designation. In other embodiments, each CQR is defined by one or more access conditions and a CQR level, wherein the CQR level may be related to how restrictive the one or more access conditions that are defining the CQR.

In other embodiments, various access conditions may be defined for each CQR depending on the type of base station that desires to access the same resources simultaneously. That is, in some embodiments a CQR will included one or more access conditions for a particular type of base station for each channel quality level. For example, a preferred Femto base station may set less restrictive access conditions to other Femto base stations of the same owner or household, but set more restrictive access conditions for Femto base stations of another owner or household. In such an embodiment, the condition table may be structured as the following:

| Channel Quality Level | Access Condition for other base station |
|---|---|
| L1 | Base Station Target Type T1: Description of access condition<br>Base Station Target Type T2: Description of access condition<br>. . . |
| L2 | Base Station Target Type T1: Description of access condition<br>Base Station Target Type T2: Description of access condition<br>. . . |

-continued

| Channel Quality Level | Access Condition for other base station |
|---|---|
| L3 | Base Station Target Type T1: Description of access condition |
|  | Base Station Target Type T2: Description of access condition |
|  | ... |
| ... | ... |

The base station target type may be chosen as a function, individually or in combination, of the following base station characteristics (many others are also possible): base station ownership (owned by an operator, owned by a specific user), base station Operator (operated by a given operator, operated by a given user in case of Femto base stations), base station type (Macro-Cell, Pico-Cell, Femto-Cell), a base station performing various types of critical tasks, such as ensuring emergency services. Thus, a hierarchy of base stations may be established, wherein some base stations may be subject to less restrictive CQRs than other base stations for the same radio resources.

In some embodiments, condition tables are transmitted from a base station. The condition tables may, for example, be transmitted periodically at regular intervals or due to a triggering event (e.g., low network throughput or high interference levels). In some embodiments a condition table may be pre-programmed into a memory of a base station.

Access condition may include, but are not limited to, one or several of the below mentioned conditions:

A target base station type, as explained above;

A maximum output power of a target base station or group of target base stations;

A minimum distance of a target base station from a preferred base station or Macro base station;

Must apply directive transmissions in compliance with a MIMO or directive antennas schemes;

A target base station must design its data contents in compliance with certain robustness constraints (e.g., a certain level of channel coding protection needs to be introduced, the number of bits per symbol needs to be below a given threshold);

A maximum tolerated interference created by a target base station or group of target base stations onto receivers (e.g., MCDs) of a preferred base station or a Macro base station transmitting the condition table;

A target base station is allowed to use a certain sub-set of the available radio resources (e.g., only a sub-set of the available resource elements in a 3GPP LTE OFDM symbol, only transmissions at certain time intervals or frequencies are allowed);

Entirely forbidding channel access for any target base station;

Channel access allowed for a maximum number of target base stations. For example, in a dense Femto base station deployment, it may be possible that a given number of Femto base stations can transmit on a given radio resource set in parallel to a Macro base station. However, this number of Femto base station may be set at a maximum number. In some embodiments, a target base station may first inquire about the number of other Femto base stations that are already using a given resource. This may be done, for example, by sending a request to the neighboring Femto base stations.

Many more access conditions, however, are possible within the scope of various embodiments.

As explained above, a CQR may be more restrictive than other channel quality requirements. In some embodiments, the CQR level defining a CQR is based on the restrictiveness of the CQR. A CQR may be more restrictive based on the number of base stations allowed access. For example, a CQR may be more restrictive on its face (e.g., a CQR that allows one base station access to radio resources compared to a CQR that allows two base stations access to radio resources) or as applied (e.g., a CQR defined by a transmission power level access condition may allow more base stations access than a CQR defined by a minimum distance from a preferred or Macro base station).

CQR may also be more or less restricting depending on robustness constraints such as signal-to-noise/interference levels, packet error, and/or data rate. For example, one CQR may require a higher level of channel coding protection than other CQRs.

Moreover, CQRs do not necessary have to be more or less restrictive, and/or may be defined by access conditions that do not necessarily allow more or less base station access to radio resources. Thus, in some embodiments, a CQR is not defined by a CQR level. In some embodiments, CQRs may be defined by two or more conditions combined by inclusive OR or AND logical operators. In some embodiments, several CQRs may be assigned to the same plurality of radio resources and thus allow access to the radio resources if a target base station satisfies one CQR or some combination of CQRs.

FIG. 1A shows a data frame containing CQRs according to an embodiment.

Data frame 100 is shown and is expanded out into Headers 102-106 and Radio Resource Fields 108-114. Headers 102, 104, and 106 contain pointer data indentifying which radio resource fields require which CQR levels, wherein the radio resources are regrouped within a field corresponding to the CQR level that the radio resources are assigned to.

For example, Header 102 indicates that Radio Resource Field 108 is assigned to L1 CQR. Header 104 indicates that Radio Resource Field 110 is assigned to L2 CQR. Header 106 indicates that Radio Resource Field 112 is assigned to Ln CQR. In some embodiments, radio resource fields that have no associated pointer data are radio resource fields that require no CQRs, such as Radio Resource Field 114.

The order of the fields can be handled in many ways. In FIG. 1, the order is L1, L2, and Ln. Alternatively, of course, it could be Ln, L2, and L1 or in any other order. The radio resources of each CQR are respectively contained within a field of Data Frame 100.

Figure 1B:
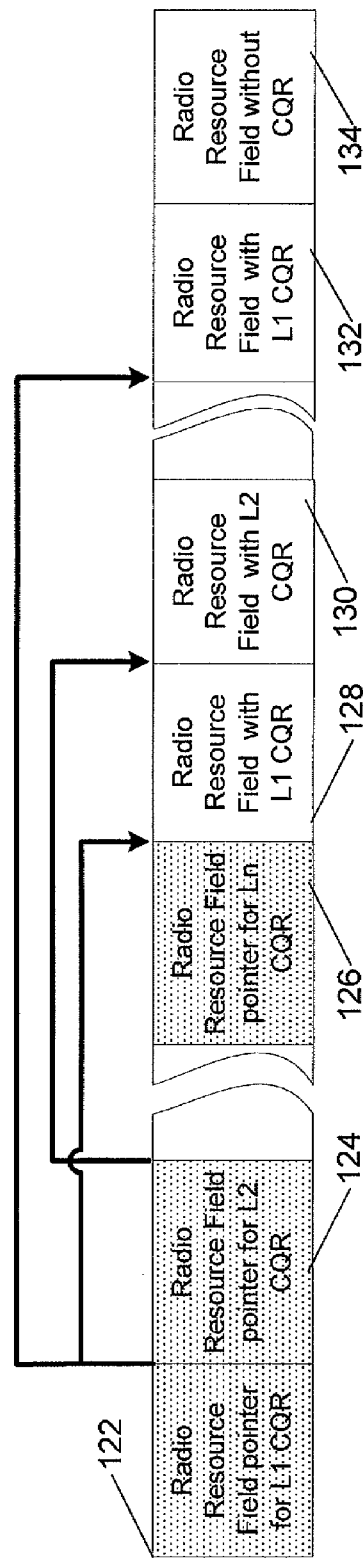
FIG. 1B shows a data frame containing channel quality requirements according to another embodiment.

FIG. 1B shows a data frame containing channel quality requirements according to another embodiment. Data frame 120 is shown and is expanded out into Headers 122-126 and Radio Resource Fields 128-134, wherein the radio resources of each CQR is distributed in multiple fields of the frame. Headers 122, 124, and 126 contain pointer data indentifying radio resource fields require which CQR levels. Header 122 indicates that Radio Resource Fields 128 and 132 are assigned to L1 CQR. Header 124 indicates that Radio Resource Field 130 is assigned to L2 CQR. In some embodiments, radio resource fields that have no associated pointer data are radio resource fields that require no CQRs, such as Radio Resource Field 134.

Figure 2:
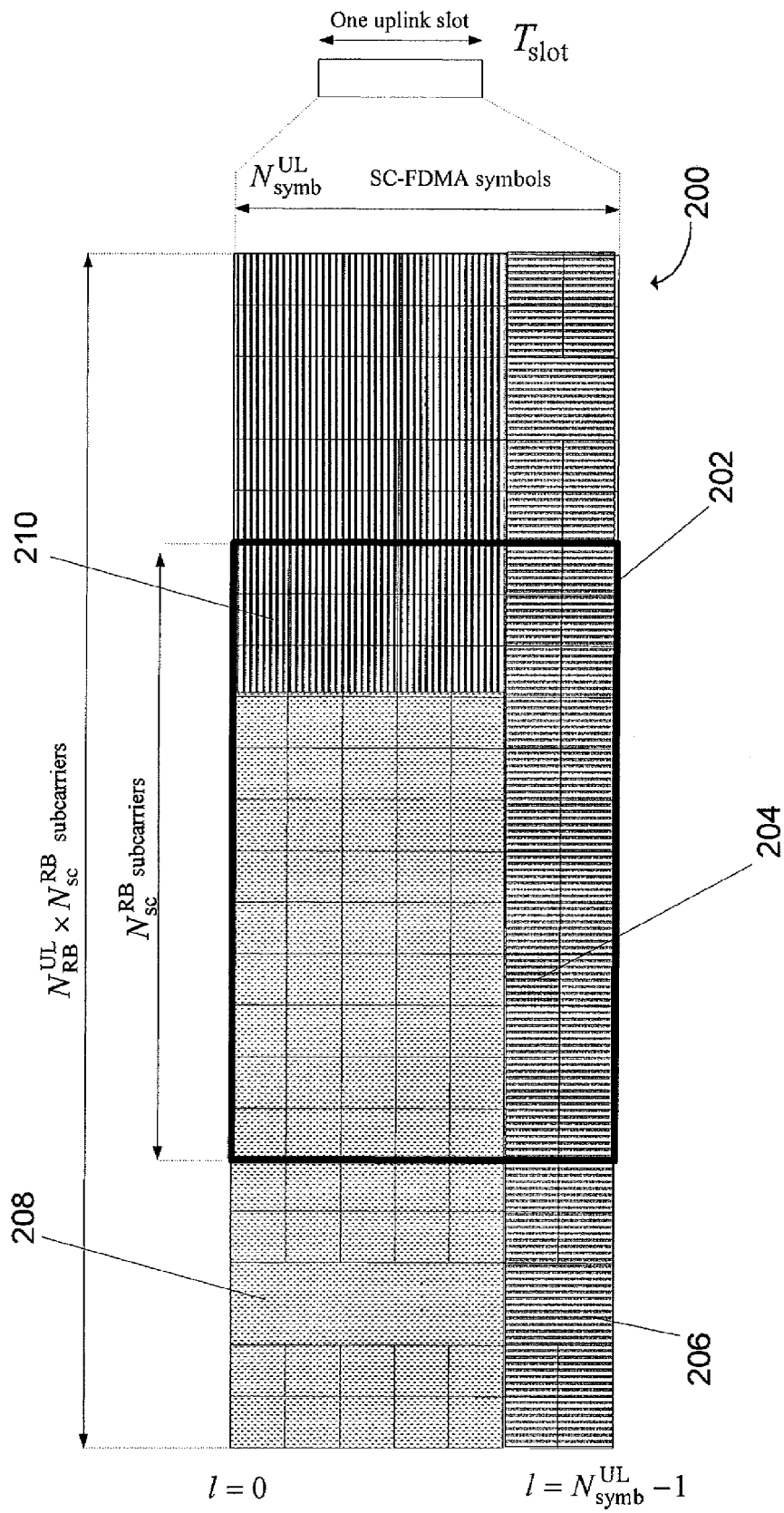
FIG. 2 shows a channel quality allocation according to a 3GPP LTE embodiment.

CQRs may be allocated to radio resource such as specific time periods, frequency resources, or a mixture of time and frequency resources. For example, FIG. 2 shows a channel quality allocation according to a 3GPP LTE embodiment. Resource Grid 200 is composed of Resource Elements 202 and includes Resource Block 204. Portions of Resource Grid 200 are allocated to L1 CQR Radio Resource Field 206, L2 CQR Radio Resource Field 208, and L3 CQR Radio Resource Field 210. In some embodiments, CQRs may be allocated by whole resource blocks. In some embodiments, CQRs may be allocated to whole frames or subframes. Thus, embodiments include allocating individual resource elements or a grouping (e.g., resource blocks, subframes, frames) of a plurality of resource elements to a CQR.

Figure 3:
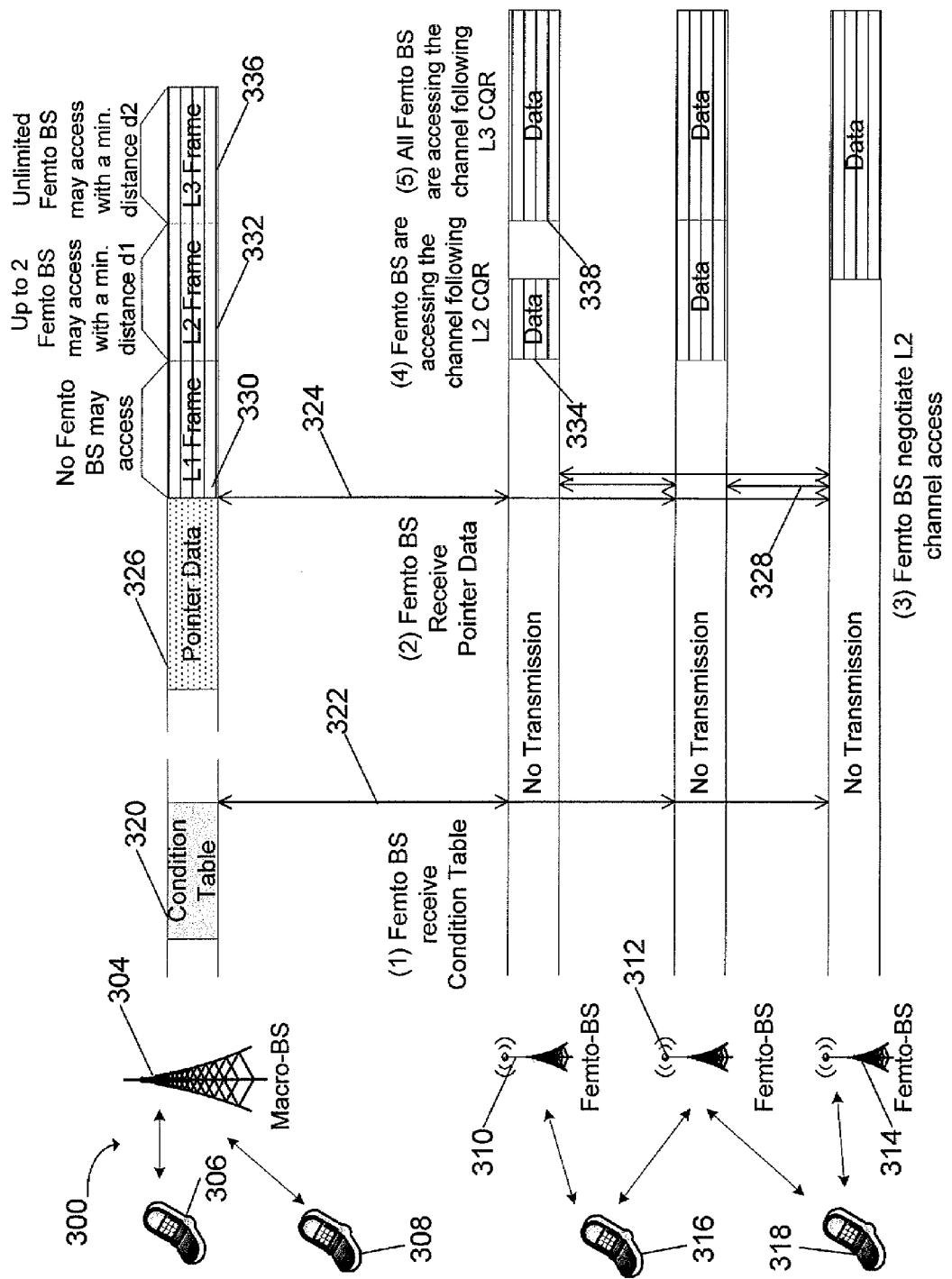
FIG. 3 shows a mobile radio communication network and a message sequence chart according to an embodiment.

FIG. 3 shows mobile radio communication network 300 and message sequence chart 302 according to an embodiment. Mobile radio communication network 300 includes Macro Base Station 304, MCD 306, MCD 308, Femto Base Station 310, Femto Base Station 312, Femto Base Station 314, MCD 316, and MCD 318. Condition Table 320 specifies that no target Base Stations (e.g., Femto Base Stations 310-314) are allowed access to frames with an L1 CQR, up to two target Base Stations at a minimum distance of d1 from Macro Base Station 304 are allowed access at the same time to frames with an L2 CQR, and an unlimited number of target Base Stations at a minimum distance of d2 from Macro Base Station 304 are allowed access at the same time to frames with an L3 CQR.

At 322, Macro Base Station 304 transmits Condition Table 320. Condition Table 320 is received by Femto Base Station 310, Femto Base Station 312, and Femto Base Station 314. At 324, Macro Base Station 304 transmits Pointer Data 326. Pointer Data 326 is received by Femto Base Station 310, Femto Base Station 312, and Femto Base Station 314. Pointer Data 326 indicates which radio resource fields have L1, L2, or L3 CQRs.

At 328, Femto Base Station 310, Femto Base Station 312, and Femto Base Station 314 may negotiate which two Femto Base Stations will have channel access for L2 CQR frames if all three Femto Base Stations meet the d1 distance criteria. For example, a negotiation procedure may include a query as to which target base stations are on and/or have data to transmit. In other embodiments, base stations may negotiate how to comply with a CQR. For example, a CQR may impose a maximum transmission power level for a group of base stations, wherein the base stations may negotiate a modulation scheme(s) and/or transmission level(s) such that the CQR is met. Base stations may also negotiate transmission schemes (e.g., MIMO), beam forming, and other parameters in order to comply with a CQR.

In some embodiments, target base stations may have priority over other base stations for access to radio resources. Thus, if more than the allowed target base stations satisfy a CQR, target base stations with higher priority may access the channel or pass so that a lower priority base station may access the channel.

Frame 330 is an L1 CQR frame and thus no Femto Base Station accesses the communication channel with L1 CQR frames. Frame 332 is an L2 CQR frame. At 334, Femto Base Station 310 and Femto Base Station 314 access the channel during Frame 332, wherein Femto Base Station 310 utilizes only a portion of Frame 332 and Femto Base Station 314 utilizes the portion of Frame 332 that Femto Base Station 310 does not utilize.

Frame 336 is an L3 CQR frame and thus an unlimited number of target Base Stations at a minimum distance of d2 from Macro Base Station 304 have access to Frame 336. At 338, Femto Base Station 310, 312, and 314 utilize the channel during Frame 336.

It will be understood that the mobile radio communication network and message sequence chart shown in FIG. 3 is only one possible mobile radio communication network architecture and message sequence, and that there may be many variations or additions to the mobile radio communication network architecture and message sequence. For example, Pointer Data 326 may be transmitted in separate field as a beacon field. In other embodiments, Pointer Data 326 may be transmitted in the header of each frame, resulting, for example, Pointer Data 326 being transmitted separately in time, frequency, or both for each frame type (e.g., L1 CQR, L2 CQR).

In another embodiment, a Macro base station or other network entity may select a one or more "preferred" Femto base stations. The preferred Femto base stations will have the right to impose CQRs on other base stations. Thus, preferred Femto base stations may transmit conditions tables to other Femto base stations in similar or same manner as Macro base station 304.

In other embodiments, a preferred base station may be a macro base station, advanced base station, HnB, HeNB, or similar devices.

In other embodiments, a preferred base station may be selected based on base station ownership (owned by an operator, owned by a specific user), base station Operator (operated by a given operator, operated by a given user in case of Femto base stations), base station type (Macro-Cell, Pico-Cell, Femto-Cell), a base station performing various types of critical tasks, such as ensuring emergency services, average traffic of a base station, or customer plan type.

Figure 4:
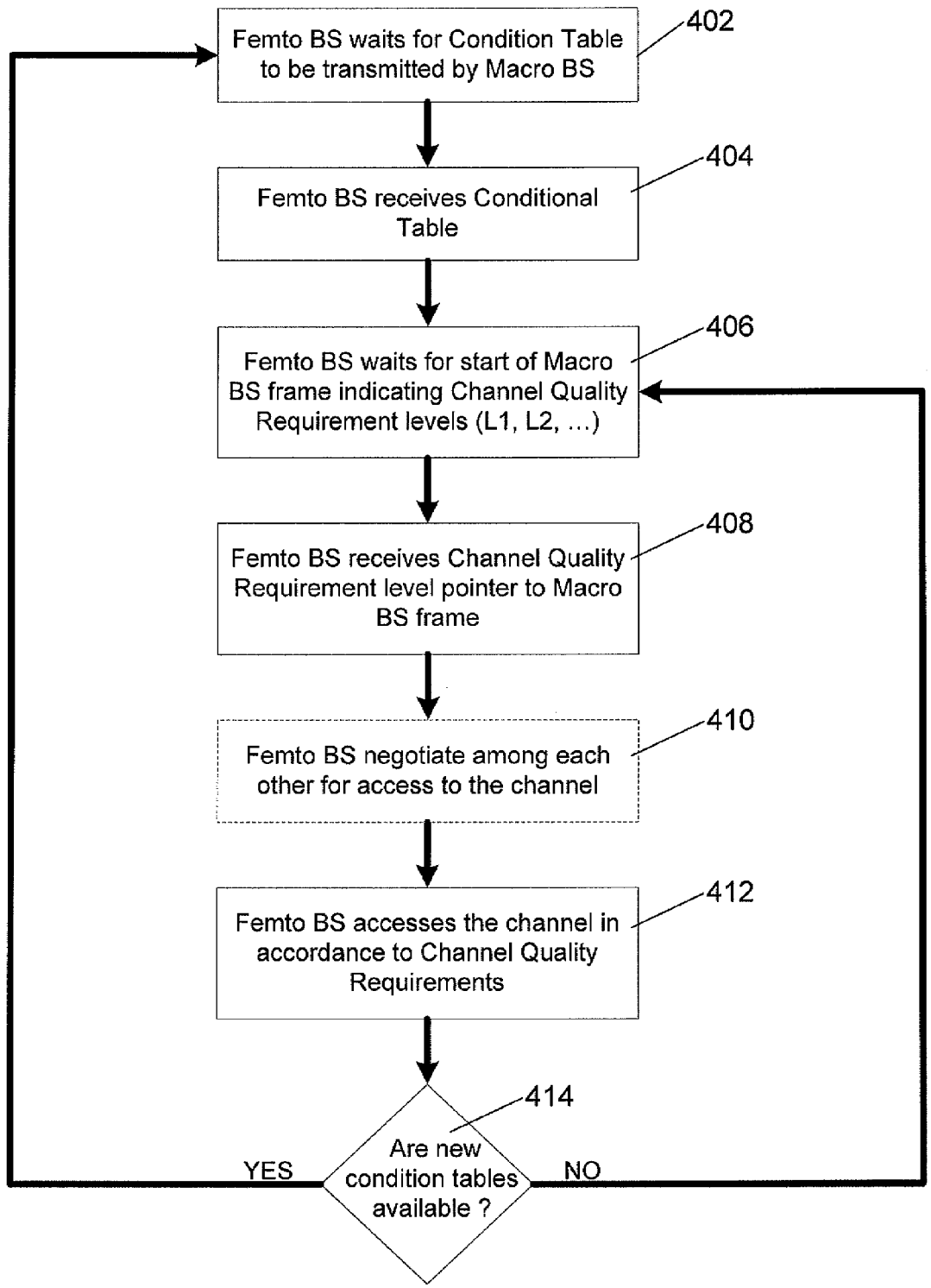
FIG. 4 is a flow chart of a channel access procedure according to an embodiment.

FIG. 4 is a flow chart of a channel access procedure according to an embodiment. At 402, a target Femto Base Station waits to receive a condition table from Macro Base Station. At 404, the target Femto Base Station receives a condition table. At 406, the target Femto Base Station waits to receive a frame indicating a CQR. At 408, the target Femto Base Station receives a CQR pointer(s) to Macro Base Station frame(s). At 410, the target Femto Base Station may negotiate among other target Femto Base Stations for access to the communication channel if required or desired so that, in some embodiments, each target Femto Base Stations achieves an acceptable data throughput but are also following the CQRs imposed by the Macro Base Station.

At 412, the target Femto Base Station accesses the communication channel in accordance to one of the transmitted CQRs. At 414, a check is made as to whether new condition tables are available. If not, process 400 continues at 406. If new conditions tables are available, process 400 continues at 402.

According to the above described embodiments, neighboring base stations that are sufficiently distant may use the same resources simultaneously. This scenario is especially relevant in case of a dense, mass deployment of Femto-Cell base stations or other base stations. In such a scenario, available resources may become scarce and accepting a level of interference may be a reasonable tradeoff in allowing neighboring (Femto) base stations to share radio resources.

As will be explained below, a balance may be desirable between a high interference level that greatly degrades neighboring base station transmissions and very restrictive CQRs that allow too few neighboring base stations access to a communication channel. In either case, the overall throughput of the neighboring base stations is lower than an optimal level.

Moreover, for highly robust data parts (e.g., data part with a high level of channel coding protection, a small number of bits is encoded onto each symbol) a high level of interference may be tolerated (e.g., L3 CQR Frames). In contrast, data parts with low robustness (such as high data rate transmission parts) may require a very low level of interference (e.g., L1 CQR Frames).

As outlined earlier, a Macro base station may designate a Femto base station as a preferred Femto base station, wherein preferred Femto base stations can define CQRs. Femto base stations, however, may be activated and de-activated by users.

In some embodiments, if a preferred Femto base station is switched off, another neighboring Femto base station is designated as a preferred Femto base station. In some embodiments, multiple neighboring Femto base stations may be designated as a preferred Femto base station.

In some embodiments, the first Femto base station has the most freedom for defining CQRs, wherein Femto base stations subsequently declared as a preferred Femto base station may be required take into account the CQRs imposed by other neighboring preferred Femto base stations in the vicinity.

In some embodiments, the subsequently declared preferred Femto base stations may not impose CQRs that are incompatible with the CQRs imposed by neighboring previously declared preferred Femto base stations. In some embodiments, incompatible CQRs may be CQRs that are mutually exclusive. In some embodiments, incompatible CQRs may be CQRs that are more restrictive than CQRs utilized by another preferred Femto base station.

Multiple preferred Femto base stations can be interpreted as a competition situation among preferred Femto base stations because each Femto base station may impose the most restrictive CQRs to ensure it meets its Quality of Service (QoS) objectives.

Thus, in some embodiments, the network entity designating preferred Femto base stations (e.g., a Macro base station) also assigns a "channel quality budget". In some embodiments, the channel quality budget includes a number of points, wherein by allocating a radio resource (e.g., a 3GPP LTE resource element or resource block, a time span of the transmitted frame) to a CQR includes paying a number of points out of the channel quality budget depending on the level of the CQR.

Figure 5:
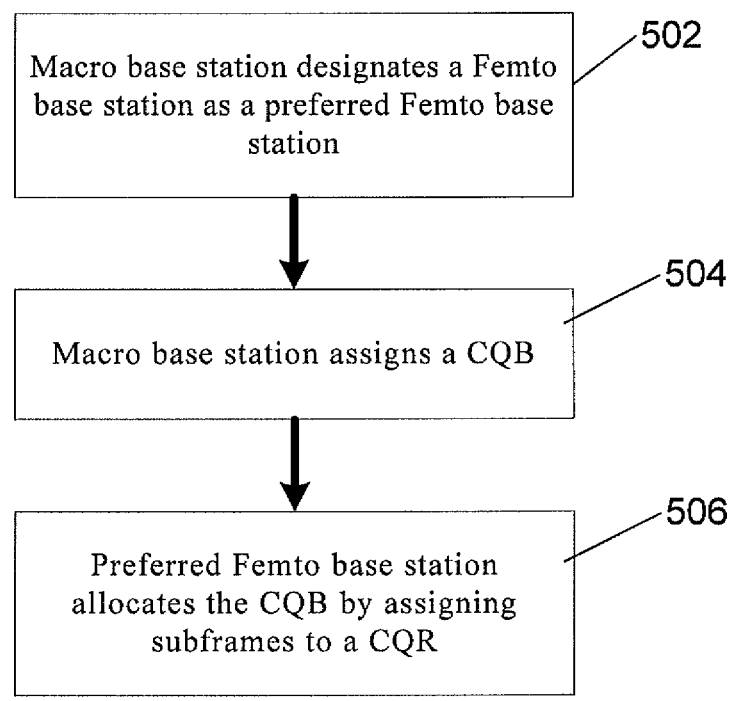
FIG. 5 is a flow chart of a channel quality budget allocation procedure according to an embodiment.

For example, FIG. 5 is a flow chart of a channel quality budget allocation procedure according to an embodiment. At 502, a Macro base station designates a Femto base station as a preferred Femto base station. At 504, Macro base station assigns a channel quality budget (CQB) of 3 points per frame. At 506, the preferred Femto base station allocates the CQB by assigning subframes to a CQR. In some embodiments, a base station allocating the CQB among subframes, includes the following "payment" structure: For an L1 CQR, CQB L1=3 points, for an L2 CQR, CQB L2=2 points, and for an L3 CQR, CQB L3=1 point. Thus, the newly designated preferred Femto base station can declare one sub-frame length of L1 CQR, or one sub-frame length of L2 CQR and one sub-frame length of L3 CQR, or three sub-frames of L3 CQR.

In some embodiments, a preferred Femto base station may also choose to spend less than the total channel quality budget. In some embodiments, base stations may request other base stations for any unused channel quality budget points. For example, a base station may be in a Quiet- or Sleep-Mode and will not access the channel for some time. During this duration, a base station's channel access rights or CQB may be transferred to another base station.

In some embodiments, CQB is given for a number of frames. Thus, a preferred Femto base station may choose to allocate the CQR evenly over all frames or allocate a high CQR for a small number of frames, wherein other frames have no or low CQRs. In some embodiments, a CQR with lower restriction might be assigned a value of 0 points.

It is possible that many neighboring preferred base stations have effectively blocked large parts of the frames to other base stations by using very restrictive CQRs, i.e. CQRs defined by high CQR levels. In some embodiments, however, neighboring base stations may renegotiate the imposed CQRs.

In some embodiments, a Macro base station may notice or is informed that too many resources are blocked by some preferred base stations and/or mobile radio communication network throughput is too low among a group of neighboring base stations. A Macro base station may be informed by active sensing or a CQR request to UEs or neighboring base stations. The Macro base station, having the ability to impose modifications to the assignments of radio resources to CQRs by preferred base stations, modifies the assignments by instructing preferred base stations to utilize CQRs defined by lower CQR levels or may transmit a new condition table with less restrictive CQRs.

Figure 6:
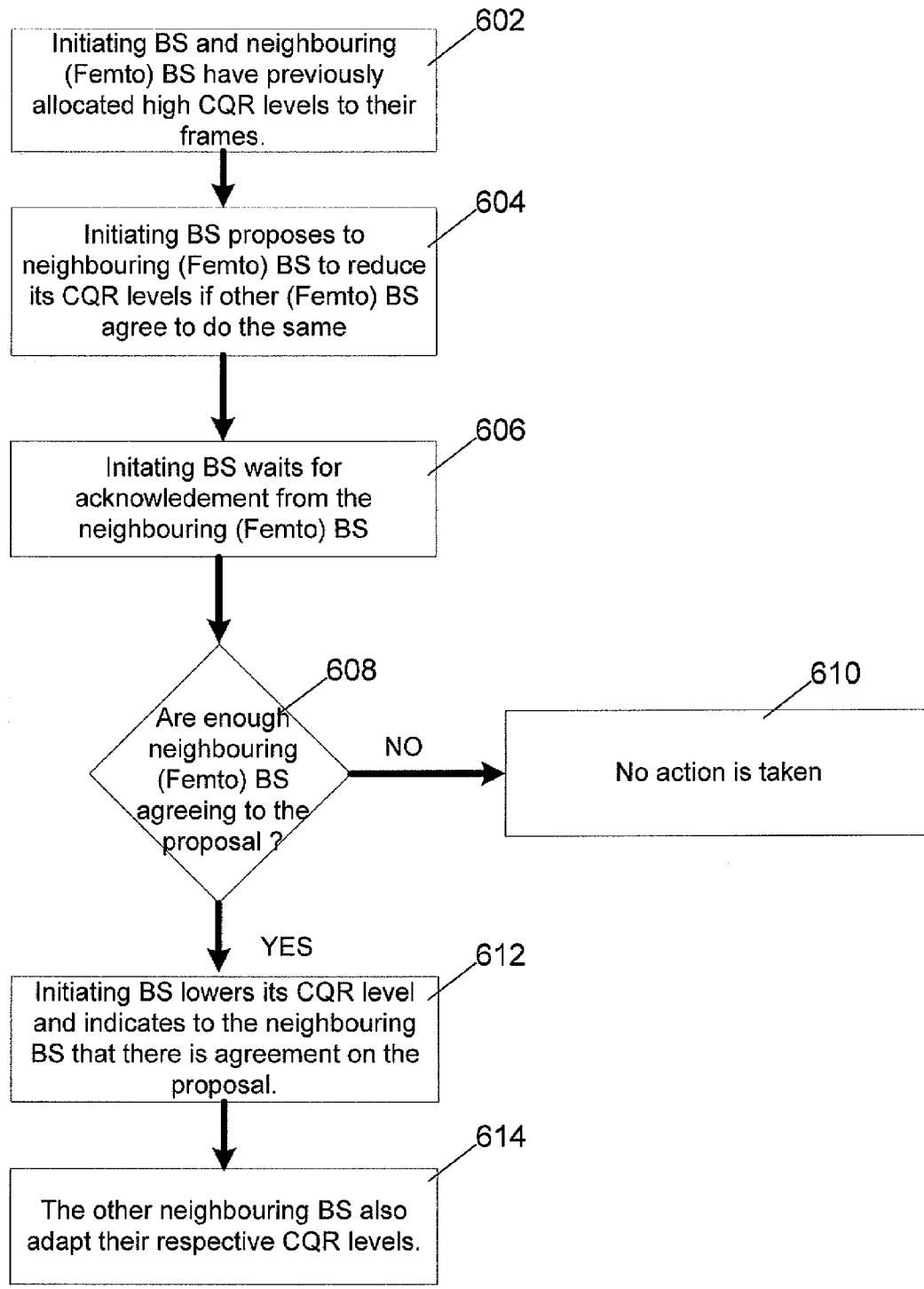
FIG. 6 is a flow chart of a channel quality requirement negotiation procedure according to an embodiment.

In some embodiments, especially when preferred base stations may also be target base stations, an initiating base station may propose to other neighboring base stations that the initiating base station will select a CQR with a lower level (i.e., less restrictive CQR) if the other base station accept to do the same. FIG. 6 is a flow chart of a CQR negotiation procedure according to an embodiment. At 602, an initiating base station and at least one other neighboring base station are reserving some or all of a frame by imposing high CQRs. At 604, the initiating base station proposes to the neighboring base stations, via a backbone IP link, over the air, or other communication medium, that the initiating base station will utilize a CQR with a lower level if the neighboring base stations do the same. In some embodiments, neighboring base stations will accept the proposal if a quantity of radio resources that would be newly accessible to the neighboring base station is met. In some embodiments, neighboring base stations will accept the proposal if it is determined that some minimal access condition (interference level, number of base stations, data robustness) will be met even though a lower CQR level will be utilized.

At 606, the imitating base station waits for the acknowledgment of the neighboring base stations. At 608, a check is made to determine if there are enough neighboring base stations agreeing to the proposal. In some embodiments, the determination may be based on a quantity of radio resource elements that would be newly accessible to the proposing base station. In some embodiments, the determination may be based on a minimum number of agreeing stations.

If not, process 600 ends at 610. If there are enough neighboring base stations agreeing to the proposal, at 612, the initiation base station utilizes a CQR with a lower level and indicates to the neighboring base stations that there is a successful agreement on the proposal. At 614, the other neighboring base stations also change their respective CQR levels. The overall reduced CQR levels will typically help improve the throughput because the initiating base station can access communication channels that would have been otherwise blocked by a CQR of another base station.

Figure 7:
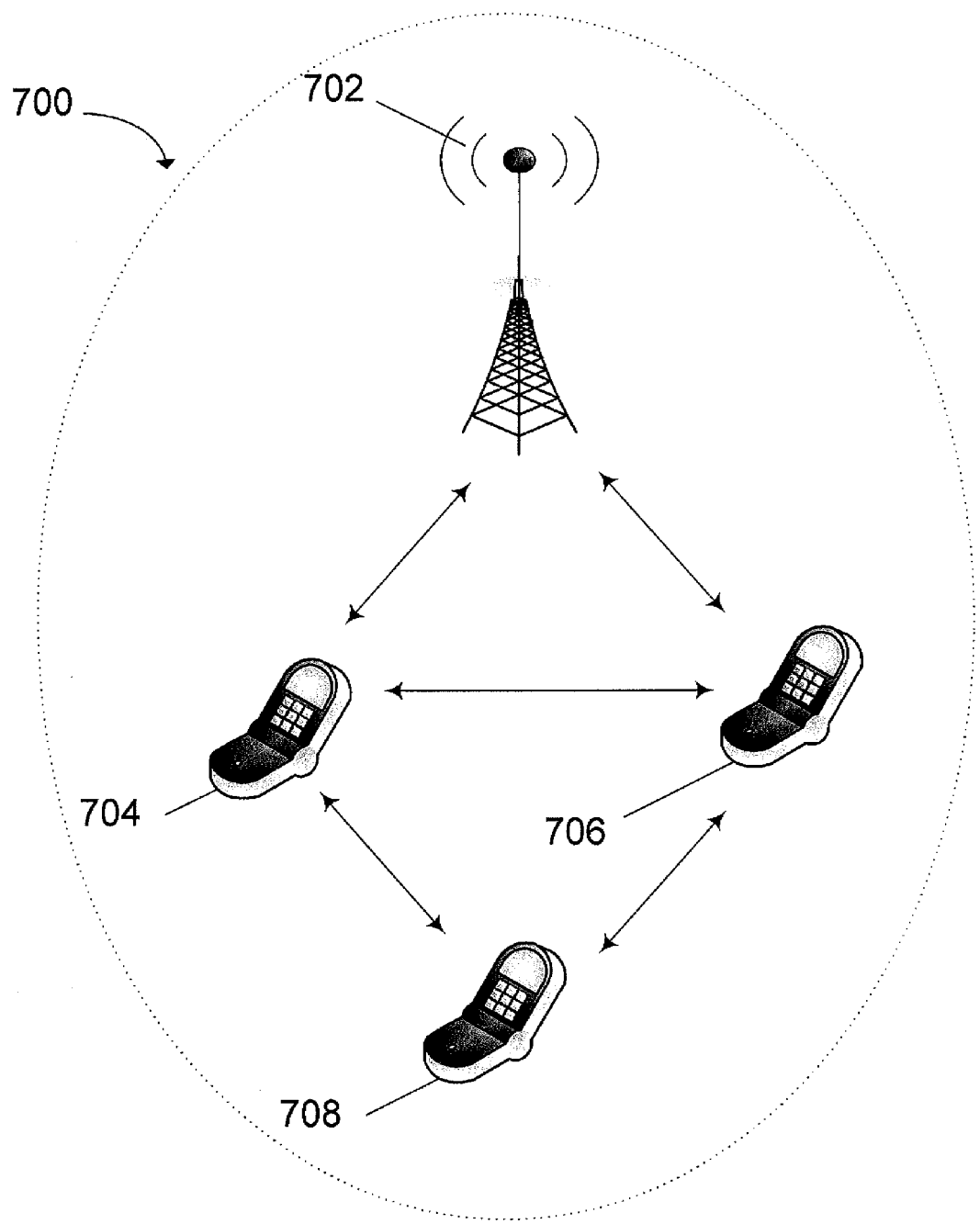
FIG. 7 shows a mobile radio communication network within an embodiment.

FIG. 7 shows mobile radio communication network 700 within an embodiment. Mobile radio communication network 700 includes Base Station 702 and MCDs 704, 706, and 708. In one embodiment Base Station 702 may select an MCD with transmission parameters or requests that will satisfy or not violate a CQR requirement imposed on Base Station 702. In some embodiments, MCDs 704, 706, or 708 may be allowed to transmit at a given time, frequency, or time/frequency slots such that a particular CQR imposed on Base Station 702 is satisfied. These slots may be selected by Base Station 702 so that its CQRs are met.

In some embodiments, Base Station 702 may impose CQRs onto MCDs 704, 706, or 708 such that a particular CQR imposed on Base Station 702 is satisfied. That is, Base Station 702 may require MCDs 704, 706, or 708 a satisfy a CQR such that Base Station 702 will satisfy a CQR, which may be the same or different CQR MCDs 704, 706, or 708 must satisfy. In some embodiments, Base Station 702 has access to a plurality of network resources, free of CQRs, and will allow MCDs 704, 706, and 708 access to the plurality of network recourses if MCDs 704, 706, and 708 satisfy a CQR assigned to the plurality of network resources.

In some embodiments, MCDs 704, 706, and 708 are configured to perform public and/or private near-field communications through peer-to-peer communication technologies such as Bluetooth and Wi-Fi Direct. In such a case, but not limited to, an MCD may be a preferred MCD that imposes CQRs onto other MCDs. The imposed CQRs may be pre-programmed into a MCD or received from a base station, an MCD, or other transmission device.

In some embodiments, MCD 704 may send a request to establish a peer-to-peer session to Base Station 702, wherein Base Station 702 responds with CQRs that must be satisfied to establish and/or continue a peer-to-peer session.

Figure 8A:
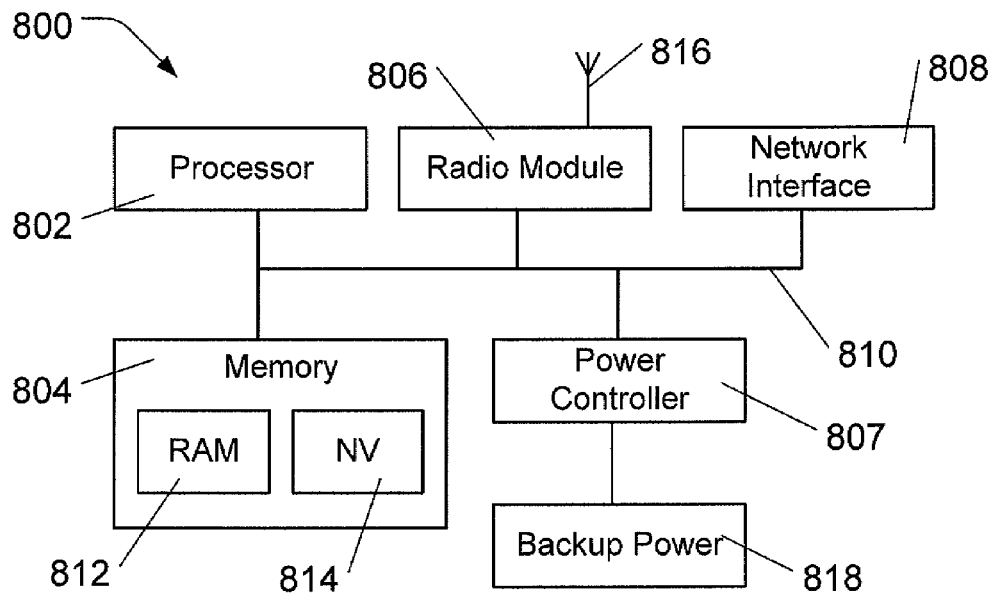
FIGS. 8A and 8B are block diagrams illustrating example architectures for a base station and a mobile communication device for use with embodiments.

FIG. 8A shows a block diagram of an example architecture for Base Station 800 for use with embodiments. Base Station 800 includes processor 802, memory 804, radio module 806, power controller 807, and network interface 208, connected by bus 810. In some embodiments, memory 804 may include random access memory 812, such as conventional DRAM, and non-volatile memory 814, such as conventional flash memory, for storing the firmware that operates Base Station 800, as well as other parameters and settings that should be retained by Base Station 800.

Radio module 806 may include antenna 816, which is used for communication wirelessly with one or more UEs, such as mobile telephones. Network interface 808 connects Base Station 800 to a core network, and may be a conventional wired network interface, such as a DSL interface, an Ethernet interface, or a USB interface that connects to an external computer or network interface device for connection to the core network. Alternatively, network interface 808 may be a wireless network interface that communicates with the core network via a wireless local-area network, a wireless metropolitan area network or a wireless wide area network.

Base Station 800 may be housed in a compact, portable housing (not shown), and may be powered by a conventional home power connection (not shown), via network interface 808 (e.g., power via a USB connection or power over Ethernet), or by other known methods of powering an electronic device. In some embodiments, Base Station base station 800 may include backup power source 818, such as a battery (which may be a rechargeable battery) connected to power controller 807, which may provide power for Base Station 800 to continue operation for a limited duration in the event of a power loss, such as may occur if Base Station 800 is unplugged or switched off.

It will be understood that the architecture shown in FIG. 8 is only one possible architecture for Base Station 800, and that there may be many variations or additions to the architecture. For example, Base Station 800 may include I/O devices, such as a display (not shown), a smart card interface and a smart card (not shown), to verify that Base Station is authorized for operation, or a variety of indicator lights or LEDs (not shown), to indicate the current status of the Base Station 800.

Figure 8B:
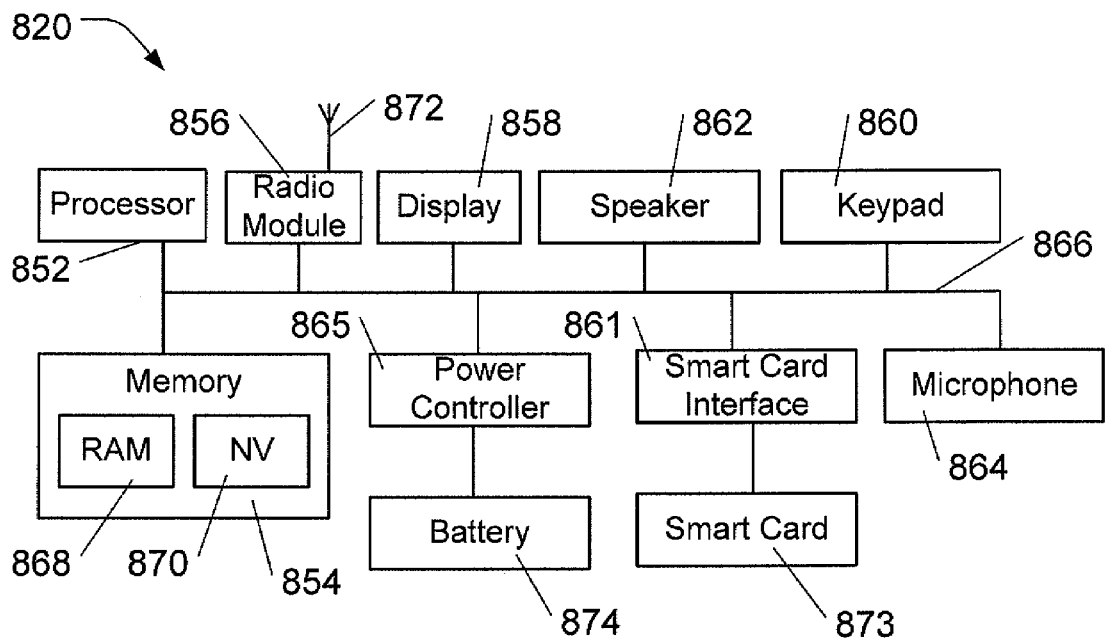

FIG. 8B shows a block diagram of an example architecture of mobile communication device 820 (in this example, a mobile telephone), for use with embodiments. Mobile communication device 820 includes processor 852, memory 854, radio module 856, display 858, keypad 860, smart card interface 861, speaker 862, microphone 864, and power controller 865, all connected by bus 866. In some embodiments, memory 854 may include random access memory 868, such as conventional DRAM, and non-volatile memory 870, such as conventional flash memory, for storing the firmware that operates mobile communication device 118, as well as other parameters and settings that should be retained by the mobile communication device 820. Radio module 856 may include antenna 872, and may be used to communicate wirelessly with a Node B base station or HNB base station.

Smart card interface 861 may be used to connect smart card 873 to mobile communication device 820. Examples of such smart cards include SIM (Subscriber Identity Module) cards, UICC (Universal Integrated Circuit Card) smart cards with integrated SIM or USIM (Universal Subscriber Identity Module), or other types of smart cards.

Mobile communication device 820 may be housed in a compact portable housing (not shown). For purposes of mobility, mobile communication device 820 would typically be powered by battery 874 connected to power controller 865.

It will be understood that the architecture shown in FIG. 8B is only one possible architecture for mobile communication device 820, and that there may be many variations or additions to the architecture. For example, speaker 862 and microphone 864 may be part of a more complex sound module, display 858 may be a touch-screen, obviating the need for keypad 860, and/or additional I/O devices, such as a wireless personal area network interface (e.g., a BLUETOOTH wireless network interface) may be added to mobile communication device 820.

In summary, embodiments include a method for two or more neighboring base stations to access a plurality of radio resources. The method includes defining a channel quality requirement by one or more access conditions, assigning the plurality of radio resources to the channel quality requirement, wherein a neighboring base station has access to the plurality of radio resources, the neighboring base station neighboring a target base station, and allowing the target base station access to the plurality of radio resources if the target base station satisfies the channel quality requirement.

In some embodiments, the method includes selecting by the target base station a mobile communication device to utilize at least a portion of the plurality of radio resources, the selection being at least partly based on the channel quality requirement.

In some embodiments, the method further includes selecting by the target base station at least a portion of the plurality of radio resources for a mobile communication device to utilize, the selection being at least partly based on the channel quality requirement.

In some embodiments, the method includes transmitting the channel quality requirement to the target base station.

In some embodiments, the method includes transmitting identification data identifying the plurality of radio resources assigned to the channel quality requirement.

In some embodiments, the method includes generating a condition table comprising at least one of a plurality of channel quality requirements. This method may include defining the at least one of the plurality of channel quality requirements by the one or more access conditions, assigning the plurality of radio resources to the at least one of the plurality of channel quality requirements, transmitting the condition table to the target base station, transmitting identification data identifying the plurality of radio resources assigned to the at least one of the plurality of channel quality requirements, and allowing the target base station access to the plurality of radio resources if the target base station satisfies the at least one of the plurality of channel quality requirements.

In some embodiments, the method includes defining each of the plurality of channel quality requirements by the one or more access conditions and a channel quality level, the channel quality level being at least partially dependent on the restrictiveness of the one or more access conditions defining each of the plurality of channel quality requirements.

In some embodiments, the method includes defining the channel quality requirement comprises selecting the one or more access conditions from a group consisting of the target base station being a type of base station, a maximum output power of the target base station, a minimum distance of the target base station from the neighboring base station, a directive transmission in compliance with a MIMO or directive antennas scheme, a design of data contents of a target base station in compliance with a robustness constraint, a maximum interference created by the target base station onto receivers of the neighboring base station, allowing the target base station access to a sub-set of the plurality of radio resources, and denying the target base station utilizing any of the plurality of radio resources.

In some embodiments, the method includes assigning a channel quality budget to the neighboring base station, assigning the at least one of the plurality of channel quality requirements a channel quality budget value, the assigned channel quality budget value being at least partially dependent on the channel quality level of the at least one of the plurality of channel quality requirements, and wherein assigning the plurality of radio resources to the at least one of the plurality of channel quality requirements comprises assigning the plurality of radio resources to the at least one of the plurality of channel quality requirements within the channel quality budget.

Embodiments also include a method for two or more neighboring base stations to access a plurality of radio resources. The method includes defining a channel quality requirement by one or more access conditions, allowing the target base station access to the plurality of radio resources if the target base station satisfies the channel quality requirement, selecting a preferred base station. The preferred base station performs assigning the plurality of radio resources to the channel quality requirement, wherein the preferred base station has access to the plurality of radio resources, the preferred base station neighboring a target base station, and transmitting the channel quality requirement to the target base station.

In some embodiments, the method includes transmitting identification data identifying the plurality of radio resources assigned to the channel quality requirement.

In some embodiments, the method includes modifying the channel quality requirement if a quantity of radio resources accessible by the target base station passes a threshold.

In some embodiments, the method includes generating a condition table comprising a plurality of channel quality requirements. This method may include defining each of the plurality of channel quality requirements by the one or more access conditions, assigning the plurality of radio resources to at least one of the plurality of channel quality requirements, transmitting the condition table to the target base station, transmitting identification data identifying the plurality of radio resources assigned to the at least one of the plurality of channel quality requirements, and allowing the target base station access to the plurality of radio resources if the target base station satisfies the at least one of the plurality of channel quality requirements.

In some embodiments, the method includes defining each of the plurality of channel quality requirements by the one or more access conditions and a channel quality level, the channel quality level being at least partially dependent on the restrictiveness of the one or more access conditions defining each of the plurality of channel quality requirements.

In some embodiments, the method includes selecting two or more preferred base stations.

In some embodiments, the method includes selecting a first and a second base station, wherein the second base station assigns the plurality of radio resources to channel quality requirements compatible with the channel quality requirement of the plurality of radio resources assigned by the first base station.

In some embodiments, the method includes assigning a channel quality budget to at least one of the two or more preferred base stations, assigning the at least one of the plurality of channel quality requirements a channel quality budget value, the assigned channel quality budget value being at least partially dependent on the channel quality level of the at least one of the plurality of channel quality requirements, and assigning the plurality of radio resources to the at least one of the plurality of channel quality requirements within the channel quality budget.

In some embodiments, the method includes one of the two or more preferred base stations further performing transmitting an offer to use a channel quality requirement of a lower channel quality level than the at least one of the plurality of channel quality requirements, and assigning a second plurality of radio resources to the channel quality requirement of the lower channel quality level if at least one other of the two or more preferred base stations accepts to use a second channel quality requirement of a lower channel quality level.

In some embodiments, the method includes the at least one other of the two or more preferred base stations further performs accepting the transmitted offer if a minimal access condition is satisfied with the second channel quality requirement.

Embodiments also include a method for a base station and a target mobile communication device to access a plurality of radio resources. The method includes defining a channel quality requirement by one or more access conditions, assigning the plurality of radio resources to the channel quality requirement, wherein the base station has access to the plurality of radio resources, the base station in wireless communication with the target mobile communication device, and allowing the target mobile communication device access to the plurality of radio resources if the target mobile communication device satisfies the channel quality requirement.

In some embodiments, the method includes transmitting the channel quality requirement to the target mobile communication device.

In some embodiments, the method includes transmitting identification data identifying the plurality of radio resources assigned to the channel quality requirement.

In some embodiments, the method includes generating a condition table comprising at least one of a plurality of channel quality requirements. This method may include defining the at least one of the plurality of channel quality requirements by the one or more access conditions, assigning the plurality of radio resources to the at least one of the plurality of channel quality requirements, transmitting the condition table to the target mobile communication device, transmitting identification data identifying the plurality of radio resources assigned to the at least one of the plurality of channel quality requirements, and allowing the mobile communication device access to the plurality of radio resources if the mobile communication device satisfies the at least one of the plurality of channel quality requirements.

In some embodiments, the method includes defining each of the plurality of channel quality requirements by the one or more access conditions and a channel quality level, the channel quality level being at least partially dependent on the restrictiveness of the one or more access conditions defining each of the plurality of channel quality requirements.

In some embodiments, the method includes defining the channel quality requirement includes selecting the one or more access conditions from a group consisting of the target mobile communication being a type of mobile communication device, a maximum output power of the target mobile communication device, a minimum distance of the target mobile communication device from the base station, a design of data contents of a target mobile communication device in compliance with a robustness constraint, a maximum interference created by the target mobile communication device onto receivers of the base station, allowing the target mobile communication device access to a sub-set of the plurality of radio resources, and denying the target mobile communication device utilizing any of the plurality of radio resources.

In some embodiments, the method includes assigning a channel quality budget to the target mobile communication device, assigning the at least one of the plurality of channel quality requirements a channel quality budget value, the assigned channel quality budget value being at least partially dependent on the channel quality level of the at least one of the plurality of channel quality requirements, and assigning the plurality of radio resources to the at least one of the plurality of channel quality requirements within the channel quality budget.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for two or more neighboring base stations to access a plurality of radio resources, the method comprising:
   defining a channel quality requirement by one or more access conditions;
   assigning the plurality of radio resources to the channel quality requirement, wherein a neighboring base station has access to the plurality of radio resources, the neighboring base station neighboring a target base station;
   allowing the target base station access to the plurality of radio resources for data transmission from the target base station if the target base station satisfies the channel quality requirement; and
   allowing the target base station to select a mobile communication device to utilize at least a portion of the plurality of radio resources, or to select at least a portion of the plurality of radio resources for a mobile communication device to utilize, the selection being at least partly based on the channel quality requirement.

2. The method of claim 1, further comprising transmitting the channel quality requirement to the target base station.

3. The method of claim 2, further comprising transmitting identification data identifying the plurality of radio resources assigned to the channel quality requirement.

4. The method of claim 3, further comprising:
   generating a condition table comprising at least one of a plurality of channel quality requirements, wherein:
   defining the channel quality requirement comprises defining the at least one of the plurality of channel quality requirements by the one or more access conditions;
   assigning the plurality of radio resources to the channel quality requirement comprises assigning the plurality of radio resources to the at least one of the plurality of channel quality requirements;
   transmitting the channel quality requirement to the target base station comprises transmitting the condition table to the target base station; and
   transmitting the identification data identifying the plurality of radio resources assigned to the channel quality requirement comprises transmitting identification data identifying the plurality of radio resources assigned to the at least one of the plurality of channel quality requirements;
   allowing the target base station access to the plurality of radio resources if the target base station satisfies the channel quality requirement comprises allowing the target base station access to the plurality of radio resources if the target base station satisfies the at least one of the plurality of channel quality requirements.

5. The method of claim 4, wherein defining each of the plurality of channel quality requirements by the one or more access conditions comprises defining each of the plurality of channel quality requirements by the one or more access conditions and a channel quality level, the channel quality level being at least partially dependent on the restrictiveness of the one or more access conditions defining each of the plurality of channel quality requirements.

6. The method of claim 5, further comprising:
   assigning a channel quality budget to the neighboring base station;
   assigning the at least one of the plurality of channel quality requirements a channel quality budget value, the assigned channel quality budget value being at least partially dependent on the channel quality level of the at least one of the plurality of channel quality requirements; and
   wherein assigning the plurality of radio resources to the at least one of the plurality of channel quality requirements comprises assigning the plurality of radio resources to the at least one of the plurality of channel quality requirements within the channel quality budget.

7. The method of claim 1, wherein defining the channel quality requirement comprises selecting the one or more access conditions from a group consisting of:
   the target base station being a type of base station;
   a maximum output power of the target base station;
   a minimum distance of the target base station from the neighboring base station;
   a directive transmission in compliance with a MIMO or directive antennas scheme;
   a design of data contents of a target base station in compliance with a robustness constraint;
   a maximum interference created by the target base station onto receivers of the neighboring base station;
   allowing the target base station access to a sub-set of the plurality of radio resources; and
   denying the target base station utilizing any of the plurality of radio resources.

8. A base station comprising:
a processor;
a radio module; and a memory, the memory comprising a set of instructions that when executed by the processor causes the base station to:
assign a plurality of radio resources to a channel quality requirement, wherein the base station has access to the plurality of radio resources, the base station neighboring a target base station; and
transmit the channel quality requirement to the target base station, wherein the target base station is allowed access to the plurality of radio resources for data transmission from the target base station if the target base station satisfies the channel quality requirement, the channel quality requirement defined by one or more access conditions and wherein the target base station is allowed to select a mobile communication device to utilize at least a portion of the plurality of radio resources, or select at least a portion of the plurality of radio resources for a mobile communication device to utilize, the selection being at least partly based on the channel quality requirement.

9. The base station of claim 8, wherein the one or more access conditions is selected from a group consisting of:
the target base station being a type of base station;
a maximum output power of the target base station;
a minimum distance of the target base station from the neighboring base station;
a directive transmission in compliance with a MIMO or directive antennas scheme;
a design of data contents of a target base station in compliance with a robustness constraint;
a maximum interference created by the target base station onto receivers of the neighboring base station;
allowing the target base station access to a sub-set of the plurality of radio resources; and
denying the target base station utilizing any of the plurality of radio resources.

10. The base station of claim 8, wherein the memory further comprises a set of instructions that when executed by the processor causes the base station to transmit identification data identifying the plurality of radio resources assigned to the channel quality requirement.

11. The base station of claim 10, wherein the memory comprising the set of instructions that when executed by the processor further cause the base station to:
assign a plurality of radio resources to at least one of a plurality of channel quality requirements;
transmit a condition table to the target base station, wherein the condition table comprises the at least one of the plurality of channel quality requirements and each of the plurality of channel quality requirements are defined by the one or more access conditions; and
transmit identification data identifying the plurality of radio resources assigned to the at least one of the plurality of channel quality requirements, wherein the target base station is allowed access to the plurality of radio resources if the target base station satisfies the at least one of the plurality of channel quality requirements.

12. The base station of claim 11, wherein each of the plurality of channel quality requirements are defined by the one or more access conditions and a channel quality level, the channel quality level being at least partially dependent on the restrictiveness of the one or more access conditions defining each of the plurality of channel quality requirements.

13. The base station of claim 12, wherein the memory comprises a further set of instructions that when executed by the processor causes the base station to assign the plurality of radio resources to channel quality requirements compatible with channel quality requirements assigned to the plurality of radio resources by a neighboring base station.

14. The base station of claim 12, wherein the memory further comprises a set of instructions that when executed by the processor further causes the base station to assign the plurality of radio resources to the at least one of the plurality of channel quality requirements within a channel quality budget, wherein a channel quality budget value is assigned to the at least one of the plurality of channel quality requirements, the assigned channel quality budget value being at least partially dependent on the channel quality level of the at least one of the plurality of channel quality requirements.

15. The base station of claim 12, wherein the memory of the base station comprises a further set of instructions that when executed by the processor causes the base stations to:
transmit an offer to use a channel quality requirement of a lower channel quality level than the at least one of the plurality of channel quality requirements;
assign a second plurality of radio resources to the channel quality requirement of the lower channel quality level if at least one other base station accepts to use a lower channel quality level.

16. A base station comprising:
a processor;
a radio module; and
a memory, the memory comprising a set of instructions that when executed by the processor causes the base station to have access to a plurality of radio resources assigned to a channel quality requirement for data transmission from the base station if the base station satisfies the channel quality requirement, the channel quality requirement being defined by one or more access conditions and causes the base station to select a mobile communication device to utilize at least a portion of the plurality of radio resources, or to select at least a portion of the plurality of radio resources for a mobile communication device to utilize, the selection being at least partly based on the channel quality requirement.

17. A wireless network device comprising:
a processor;
a radio module; and
a memory, the memory comprising a set of instructions that when executed by the processor causes the wireless network device to:
assign a plurality of radio resources to a channel quality requirement, wherein the wireless network device has access to the plurality of radio resources, the wireless network device neighboring a target wireless network device; and
transmit the channel quality requirement to the target wireless network device, wherein the target wireless network device is allowed access to the plurality of radio resources for data transmission from the target base station if the target wireless network device satisfies the channel quality requirement, the channel quality requirement defined by one or more access conditions and wherein the target wireless network device is allowed to select a mobile communication device to utilize at least a portion of the plurality of radio resources, or to select at least a portion of the plurality of radio resources for a mobile communication device to utilize, the selection being at least partly based on the channel quality requirement.

18. A wireless network device comprising:
a processor;
a radio module; and a memory, the memory comprising a set of instructions that when executed by the processor causes the wireless network device to be allowed access to a plurality of radio resources assigned to a channel quality requirement for data transmission from the wireless network device if the wireless network device satisfies the channel quality requirement, the channel quality requirement defined by one or more access conditions and causes the wireless network device to be allowed to select a mobile communication device to utilize at least a portion of the plurality of radio resources, or to select at least a portion of the plurality of radio resources for a mobile communication device to utilize, the selection being at least partly based on the channel quality requirement.

* * * * *